(12) United States Patent
Pedrinelli et al.

(10) Patent No.: US 11,541,703 B2
(45) Date of Patent: Jan. 3, 2023

(54) PNEUMATIC TIRE EQUIPPED WITH A TRANSPONDER

(71) Applicant: BRIDGESTONE EUROPE NV/SA, Zaventem (BE)

(72) Inventors: Marco Pedrinelli, Rome (IT); Emiliano Sabetti, Rome (IT); Mauro Mirabile, Rome (IT); Emanuele Rosa, Rome (IT)

(73) Assignee: Bridgestone Europe N.V./S.A., Zaventem (BE)

( * ) Notice: Subject to any disclaimer, the term of this patent is extended or adjusted under 35 U.S.C. 154(b) by 155 days.

(21) Appl. No.: 17/050,572

(22) PCT Filed: Apr. 17, 2019

(86) PCT No.: PCT/IB2019/053174
§ 371 (c)(1),
(2) Date: Oct. 26, 2020

(87) PCT Pub. No.: WO2019/207422
PCT Pub. Date: Oct. 31, 2019

(65) Prior Publication Data
US 2021/0237522 A1    Aug. 5, 2021

(30) Foreign Application Priority Data
Apr. 27, 2018    (IT) .................... IT102018000004925

(51) Int. Cl.
*B60C 23/04*    (2006.01)
*B29D 30/00*    (2006.01)
(Continued)

(52) U.S. Cl.
CPC ...... *B60C 23/0493* (2013.01); *B29D 30/0061* (2013.01); *B60C 15/06* (2013.01);
(Continued)

(58) Field of Classification Search
CPC ................ B60C 23/0493; B60C 15/06; B60C 2015/0614; B60C 3/04; B60C 19/00;
(Continued)

(56) References Cited

U.S. PATENT DOCUMENTS

| 11,018,406 B2 * | 5/2021 | Destraves .......... B29D 30/0601 |
| 2010/0122757 A1 | 5/2010 | Lionetti et al. |

(Continued)

FOREIGN PATENT DOCUMENTS

| CN | 107683214 A | 2/2018 |
| EP | 1978345 A2 | 10/2008 |

(Continued)

OTHER PUBLICATIONS

International Searching Authority: International Search Report for corresponding International Patent Application No. PCT/IB2019/053174 dated Jun. 28, 2019, 11 pages.

*Primary Examiner* — Alison L Hindenlang
*Assistant Examiner* — Shibin Liang
(74) *Attorney, Agent, or Firm* — Patterson Intellectual Property Law, P.C.

(57) ABSTRACT

A pneumatic tire (1) having: a toroidal carcass (2), which is comprised of a body ply (3) partially collapsed onto itself and therefore having two lateral flaps; two annular beads (4), each of which is surrounded by the body ply (3) and has a bead core (5) and a bead filler (6); an annular tread (7); a pair of sidewalls (11) arranged externally to the body ply (3) between the tread (7) and the beads (4); a pair of abrasion gum strips (12) arranged externally to the body ply (3) under the sidewalls (13) and at the beads (4); and a transponder (13) which is arranged in contact with the body ply (3) at a flap of the body ply (3) and is located below an edge (19) of the body ply (3) between the edge (19) of the body ply (3) and the bead (4).

19 Claims, 8 Drawing Sheets

(51) Int. Cl.
*B60C 15/06* (2006.01)
*G06K 19/077* (2006.01)

(52) U.S. Cl.
CPC .......... *G06K 19/07764* (2013.01); *B29D 2030/0077* (2013.01); *B60C 2015/0614* (2013.01)

(58) Field of Classification Search
CPC .......... B60C 5/00; B29D 30/0061; B29D 2030/0077; B29D 30/00; G06K 19/07764; G06K 19/067; C09J 175/04; H01Q 1/22; C08L 75/04
See application file for complete search history.

(56) References Cited

U.S. PATENT DOCUMENTS

| | | | |
|---|---|---|---|
| 2011/0175778 A1 | 7/2011 | Myatt | |
| 2011/0259497 A1* | 10/2011 | Borot | B60C 23/0493 524/588 |
| 2020/0180366 A1* | 6/2020 | Nakajima | B60C 19/00 |

FOREIGN PATENT DOCUMENTS

| | | | | |
|---|---|---|---|---|
| JP | H06122302 A | | 5/1994 | |
| JP | 2015223918 | * | 12/2015 | ............ B60C 23/04 |
| KR | 20100082464 A | | 7/2010 | |
| KR | 101312841 B1 | | 9/2013 | |

\* cited by examiner

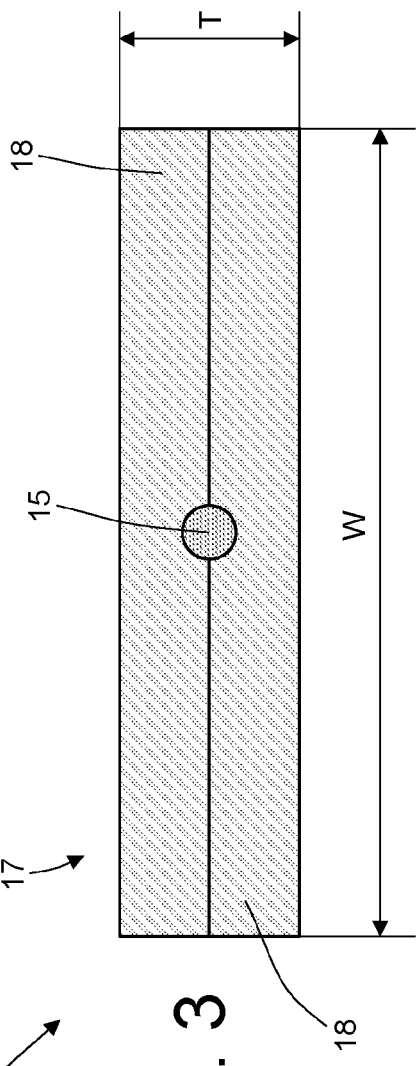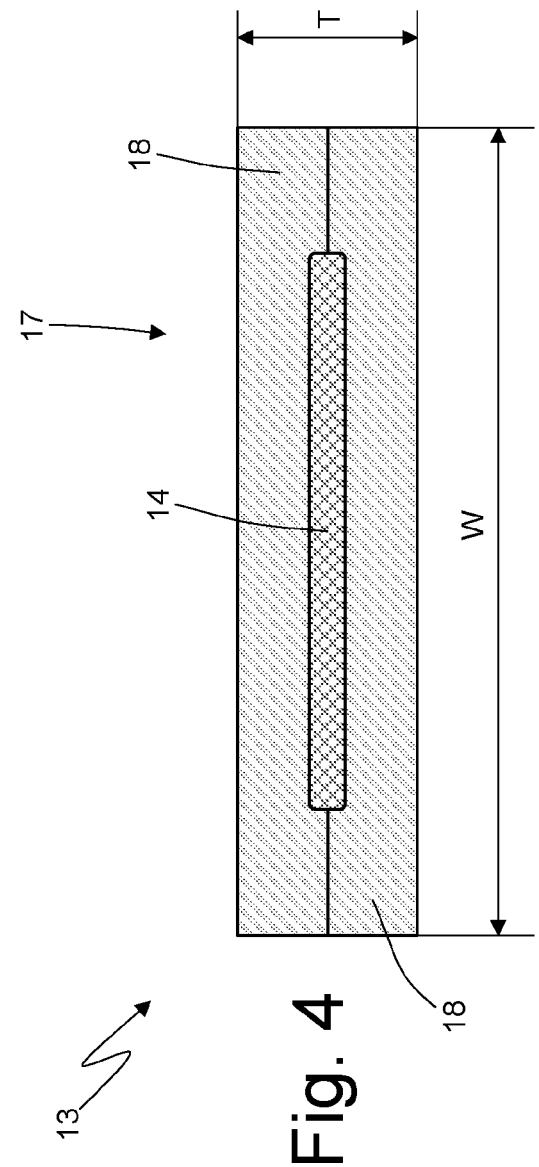

PNEUMATIC TIRE EQUIPPED WITH A TRANSPONDER

CROSS-REFERENCE

This application claims the benefit of and priority to International Patent Application No. PCT/IB2019/053174, filed Apr. 17, 2019, which claims priority to Italian Patent Application No. IT 102018000004925, filed Apr. 27, 2018, both of the disclosures of which are incorporated herein by reference in their entirety.

DESCRIPTION

Technical Sector

The present disclosure relates to a pneumatic tire equipped with a transponder.

Prior Art

In recent years, so-called "smart" pneumatic tires have emerged, which are capable of forming an active part of modern vehicles, supplying information concerning the type of pneumatic tires mounted, information concerning the status of the pneumatic tires and also information concerning ambient conditions.

A "smart" pneumatic tire is normally equipped with a transponder (that is, an electronic device suitable for communicating in radio frequency) which permits remote communication (that is, to both the vehicle on which the tire is mounted and to an operator who must carry out the checking or the replacement of the pneumatic tire) of the identification, the characteristics and the history of the pneumatic tire.

Recently, the unification has been proposed of RFID ("Radio-Frequency IDentification") technology, based on the presence of transponders, with TPMS ("Tire Pressure Monitoring Systems") technology, which measures the effective inflation pressure in order to memorize the effective inflation pressure and then remotely communicate the effective inflation pressure by means of the transponders themselves.

Initially, it was proposed to glue a transponder onto the internal surface or onto the external surface of a sidewall of a pneumatic tire; this solution is extremely simple from the design perspective and is applicable also to existing pneumatic tires; however, by contrast, it does not guarantee that the transponder will not detach from the pneumatic tire (especially when it is glued to the external surface) following the cyclical deformations to which the sidewall of a pneumatic tire is subjected.

Thereafter, the integration of a transponder within the structure of a pneumatic tire was proposed, that is, within the interior of the various layers that make up the pneumatic tire.

The patent application US20080289736A1 describes a pneumatic tire wherein a transponder is integrated into the structure of the pneumatic tire at the bead; in particular the transponder is arranged between a sidewall and a bead filler above the flap of the body ply.

The patent application EP2186658A1 describes a pneumatic tire wherein a transponder is integrated into the structure of the pneumatic tire at the bead; in particular the transponder is arranged between a sidewall and a bead filler above the flap of the body ply, or the transponder is arranged between a bead filler and the body ply (that is, within the flap of the body ply).

The patent application EP1366931A2 describes a pneumatic tire wherein a transponder is integrated into the structure of the pneumatic tire at the bead; in particular the transponder is immersed within the bead filler and is located in the interior of the flap of the body ply or the transponder is immersed within the rubber arranged more to the inside of the bead core (therefore, it is located on the exterior of the flap of the body ply).

The patent application US2010122757A1 describes a pneumatic tire wherein a transponder is preferably arranged at a bead between an end of an abrasion gum strip and an end of the bead filler.

The patent application EP1978345A2 describes a method for estimating a force acting on a pneumatic tire while it is rolling which utilizes at least seven sensors mounted on a portion of a sidewall.

The patent application US2011175778A1 describes a pneumatic tire wherein a transponder is arranged between a bead filler and a sidewall.

The patent application EP1552968A1 describes a pneumatic tire wherein a transponder is arranged at a bead radially more to the inside of an end of a body ply.

Nevertheless, the above-described positionings of the transponder within a pneumatic tire are not ideal, because they do not make it possible to minimize the stresses and deformations to which the transponder is subjected (both during the construction of the pneumatic tire and during the use of the pneumatic tire) and, at the same time, minimizing transponder radio frequency communications disturbances and interference.

DESCRIPTION OF THE DISCLOSURE

The aim of the present disclosure is to provide a pneumatic tire equipped with a transponder that is free from the disadvantages described above and that is, in particular, easy and inexpensive to implement.

According to the present disclosure, a pneumatic tire equipped with a transponder is provided, as set forth in the appended claims.

The claims describe preferred embodiments of the present disclosure forming an integral part of the present description.

BRIEF DESCRIPTION OF THE DRAWINGS

The present disclosure is now described in reference to the attached drawings, which illustrate several non-limiting exemplary embodiments, wherein:

FIGS. 3 and 4 are two views in cross section of the transponder of FIG. 2 according to the section line III-III and according to the section line IV-IV;

PREFERRED EMBODIMENTS OF THE DISCLOSURE

Figure 1:
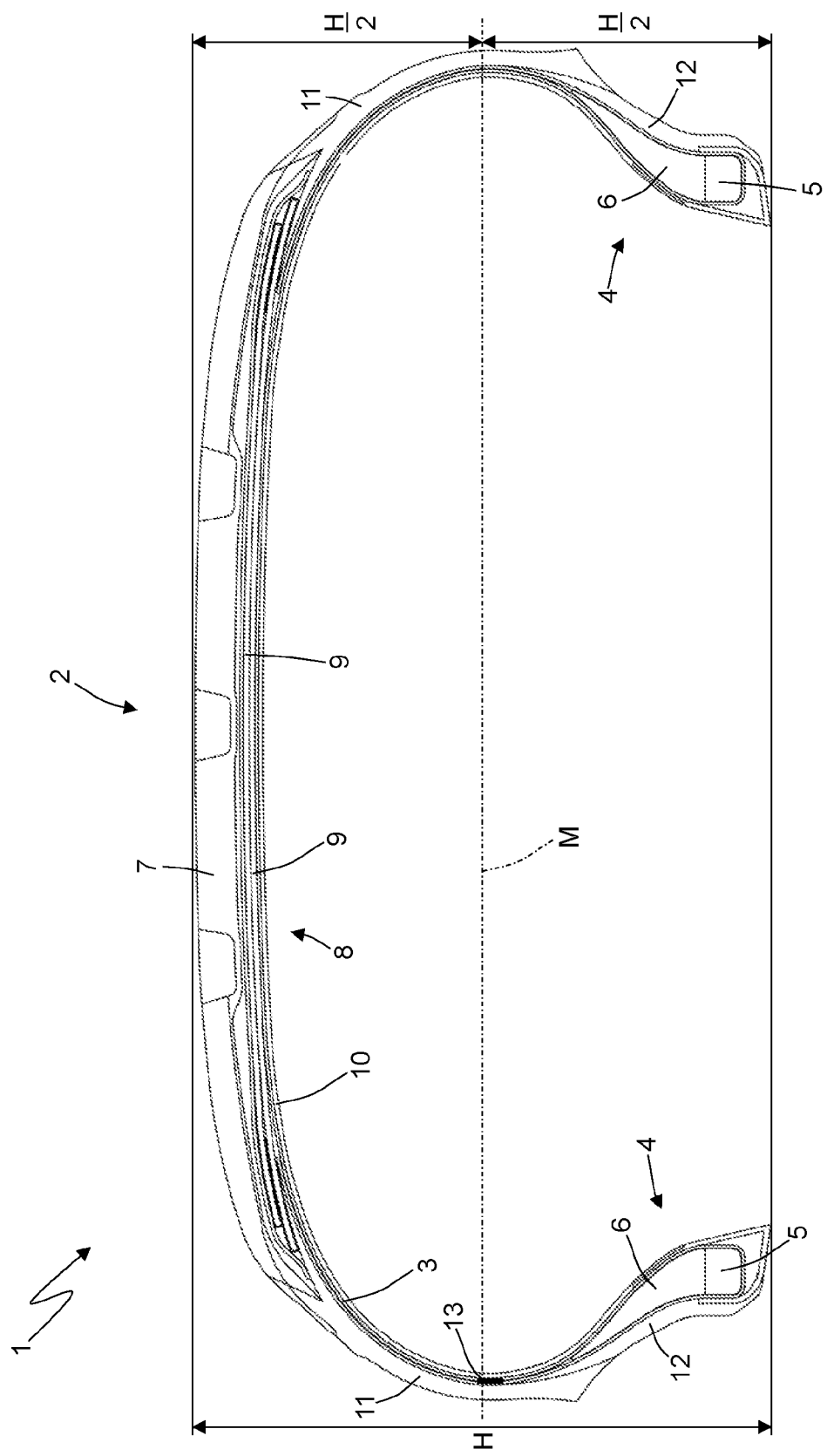
FIG. 1 is a schematic cross section, with parts removed for clarity, of a pneumatic tire manufactured in accordance with the present disclosure.

In FIG. 1 a pneumatic tire is indicated as a whole by the number 1 and comprises a toroidal carcass 2, which comprises a single body ply 3 partially collapsed upon itself and therefore having two lateral flaps (that is, two layers superimposed on one another and jointly referred to as "turn-up"). In each flap of the body ply 3, an edge (that is, a terminal end) of the body ply 3 is supported against an intermediate portion of the body ply itself. In other words, the toroidal carcass 2 comprises only and uniquely the single and unique body ply 3 and therefore does not comprise any other body ply (whether forming the flaps or not) superimposed on the body ply 3.

On the opposite sides of the carcass 2, two annular beads 4 are arranged, each of which is surrounded by the body ply 3 (that is, it is surrounded by the flaps of the body ply 3), and has a bead core 5 that is reinforced with a number of windings of a metallic wire and a bead filler 6.

The carcass 2 supports an annular tread 7; between the carcass 2 and the tread 7, a tread belt 8 is interposed, which comprises two tread plies 9. Each tread ply 9 comprises a number of cords (not shown), which are embedded within a rubber belt, which are arranged alongside one another with a given pitch and form an angle of inclination that is determined in relation to an equatorial plane of the pneumatic tire 1.

An innerliner 10 is arranged within the body ply 3 which is airtight, constitutes an inner lining and has the function of retaining the air within the pneumatic tire 1 in order to maintain the inflation pressure of the same pneumatic tire 1 over time.

The body ply 3 supports a pair of sidewalls 11 arranged externally to the body ply 3, between the tread 7 and the beads 4.

Finally, the body ply 3 supports a pair of abrasion gum strips 12 arranged externally below the sidewalls 13 and at the beads 4.

The pneumatic tire 1 is manufactured according to the construction modality referred to as "envelope," wherein each flap of the body ply 3 terminates radially below the tread ply 9 (thus, radially below the tread 7 in contact with the most interior tread ply 9); that is, in each flap an edge (that is a terminal end) of the body ply 3 which is supported against an intermediate portion of the body ply 3 itself is radially below the tread ply 9 (thus, radially below the tread 7 in contact with the most interior tread ply 9). In other words, in each flap an edge (that is, a terminal end) of the body ply 3 is in contact with the most interior tread ply 9.

According to what illustrated in FIG. 1, the transversal section of the pneumatic tire 1 has an overall height H (a thickness, that is, a radial dimension measured perpendicularly to the axis of rotation of the pneumatic tire); identified in FIG. 1 is the medial plane M of the height H of the transversal section of the pneumatic tire 1 (in other words, the plane M bisects the height H of the cross section of the pneumatic tire 1, subdividing the height H of the cross section of the pneumatic tire 1 into two identical halves, each having a height of H/2).

A transponder 13, that is, an electronic device (normally passive, that is, without an electrical power supply thereof) which is capable of memorizing the information and is capable of communicating by radio frequency, is integrated (immersed) in the interior of the pneumatic tire 1, in particular at a sidewall 11 (for example, the external sidewall 11, that is, the one turned toward the exterior of the vehicle once the pneumatic tire 1 has been mounted on the rim). In other words, the transponder 13 is a "smart label" of small dimensions which is integrated into the interior of the pneumatic tire 1 and is suitable for responding to the remote polling by specific fixed or portable devices, called readers (or else polling devices); a reader is capable of reading and/or modifying the information contained within the transponder 13 that is polling while communicating with the transponder itself 13 in radio frequency. Accordingly, the transponder 13 is a part of a reading and/writing wireless system that operates according to so-called RFID technology ("Radio-Frequency IDentification").

Figure 2:
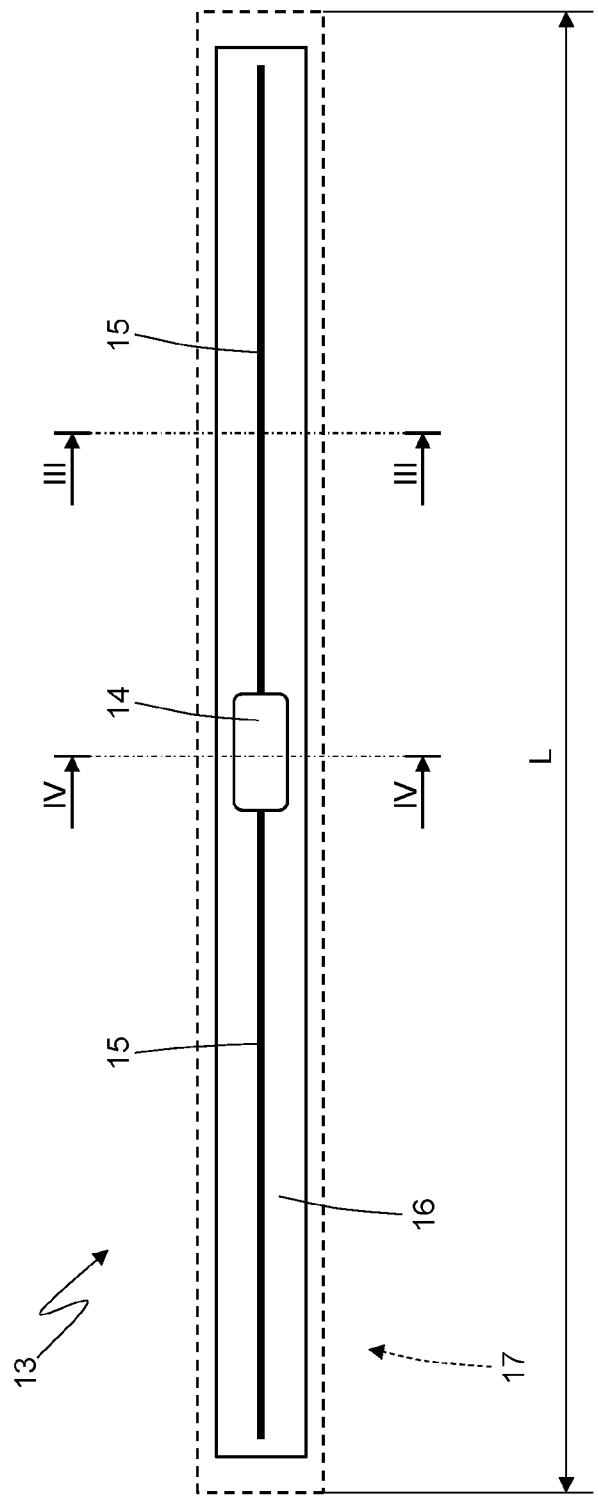
FIG. 2 is a schematic view of a transponder of the pneumatic tire of FIG. 1.

According to what is illustrated in FIG. 2, the transponder 13 comprises an electronic circuit 14 (that is, a microchip) equipped with a non-volatile memory (typically, EEPROM or FRAM, the latter more costly, but technologically more advanced), an antenna 15 connected to the electronic circuit 14, and a support 16, which carries both the electronic circuit 14 and the antenna 15 and is frequently defined as a "substrate" (typically it is made of a thin layer of mylar, plastic like PET or PVC, or other similar materials). In the embodiment illustrated in FIG. 2, the antenna 15 is a dipole antenna (or simply a dipole) and is made of two equal open arms constructed with a linear electrical conductor on which the currents flow that remotely irradiate the electromagnetic field.

In use, the antenna 15 receives an electromagnetic signal that, by electromagnetic induction, induces a difference in electrical potential in the antenna 15, which generates the circulation of an electrical current in the electronic circuit 14 to supply power to the electronic circuit 14 itself; the electronic circuit 14, thus activated, transmits the data contained within the memory thereof by means of the antenna 15 and, where appropriate, also modifies the data contained within the memory thereof.

According to what illustrated in FIGS. 2 and 3, the transponder 13 is inserted in a sleeve 17, which is made of two strips 18 of green rubber superimposed and pressed one against the other (obviously, the rubber of the two rubber strips 18 is initially raw and is vulcanized together with the rest of the pneumatic tire 1 during the final vulcanization of the pneumatic tire 1 itself); in general, the two strips 18 of green rubber of the sleeve 17 are 1-2 mm longer/wider than the transponder 13 (that is, than the electronic circuit 14 and the antenna 15). The two strips 18 of green rubber are initially parallelepiped and deform around the components of the transponder 13 when they are pressed one against the other around the transponder 13 itself. According to an alternative embodiment, the two strips of rubber 18 of the sleeve 17 are vulcanized from the start (that is, the rubber of the two strips 18 of rubber is vulcanized immediately).

According to a different embodiment (not illustrated), the support 16 is absent and the function thereof is performed by the strips 18 of rubber of the sleeve 17.

According to a preferred embodiment, the thickness T of the sleeve 17 (containing the transponder 13 within the interior thereof) is overall between 0.6 and 2 mm, the width W of the sleeve 17 is approximately 8-12 mm, and the length L of the sleeve 17 is approximately 60-80 mm.

The transponder 13 is arranged circumferentially, that is, it is arranged along a circumference centered on the axis of rotation of the pneumatic tire; it is important to set forth that the transponder 13 (contained within the sleeve 17) has a parallelepiped rectangular form, and therefore in the interior of the pneumatic tire 1 does not follow the circular progression of all of the other components of the pneumatic tire 1.

According to the embodiment illustrated in FIGS. 5 and 6, the transponder 13 (contained within the sleeve 17) is arranged at a radial distance (not zero) from an edge 19 (that is, a terminal end) of the body ply 3 (which is arranged below the tread plies 9 and, therefore, below the tread 7 in contact with the innermost tread ply 9, and it is supported against an intermediate portion of the body ply 3 itself); that is, an upper edge (end) of the transponder 13 is arranged at a radial distance (not zero) from the edge 19 of the body ply 3. Furthermore, the transponder 13 (contained within the sleeve 17) is arranged at a radial distance (not zero) from an edge 20 (that is, a terminal end) of the beads 4 (in particular an edge of the bead filler 6, at which the bead filler 6 terminates); that is, a lower edge (end) of the transponder 13 is arranged at a radial distance (not zero) from the edge 20, radially more to the outside of the bead filler 6.

Figure 5:
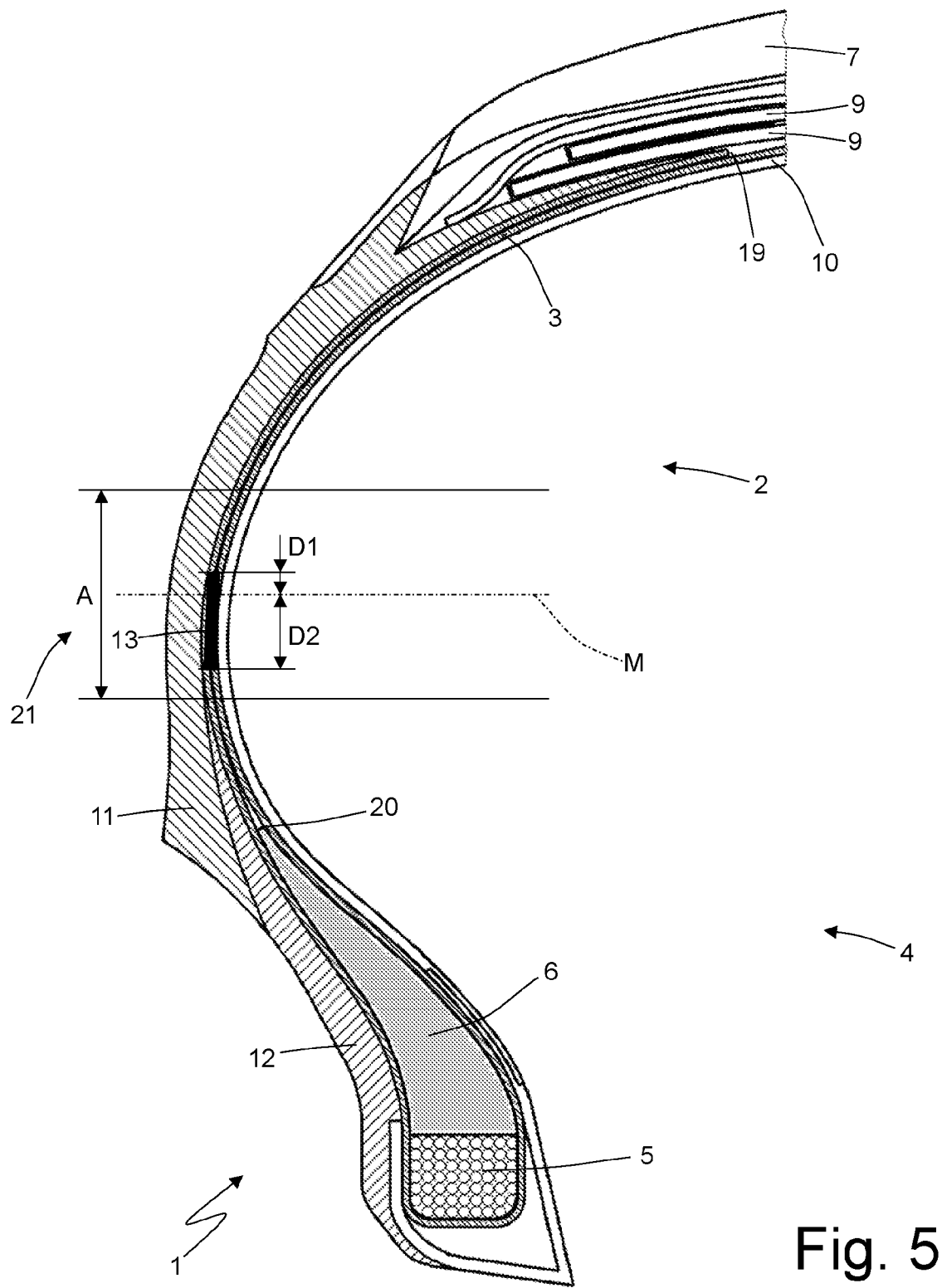
FIGS. 5 and 6 are two enlarged views of a detail of FIG. 1 according to two alternative embodiments.
Figure 6:
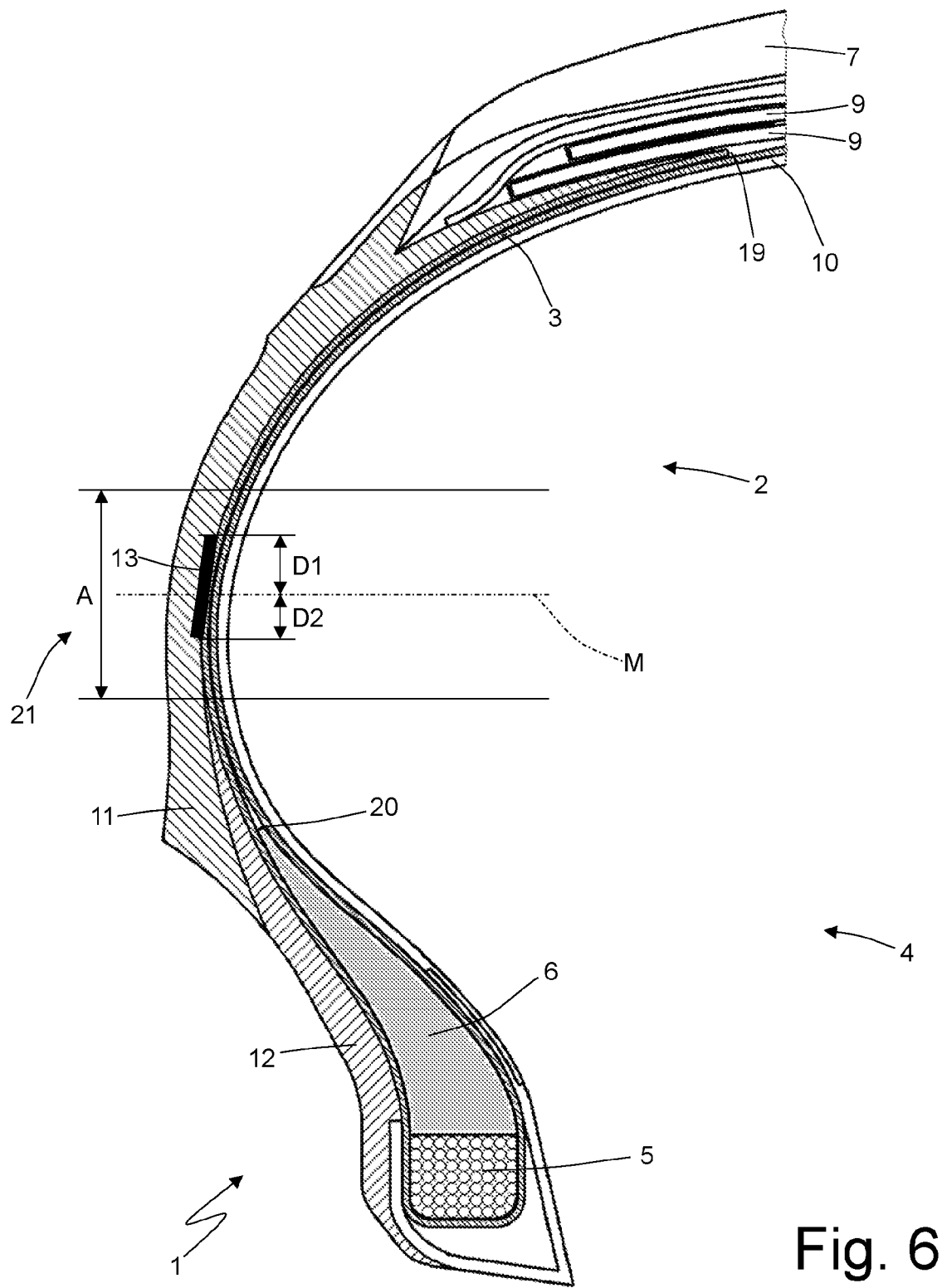

According to the embodiment illustrated in FIGS. 5 and 6, the transponder 13 (contained within the sleeve 17) is entirely contained within a band 21 which is centered on the medial plane M of the height H of the cross section of the pneumatic tire 1 and has an overall amplitude A between 16 and 24 mm (that is, the amplitude A can vary between 16 and 24 mm and is normally equal to 20 mm); in other words, the two ends of the bands 21 are arranged symmetrically at the same distance (overall between 8 and 12 mm, and normally equal to 10 mm) from the medial plane M of the height H of the cross section of the pneumatic tire 1 in such a way that the band 21 is centered on the medial plane M of the height H of the cross section of the pneumatic tire 1 and has the overall amplitude A between 16 and 24 mm. The transponder 13 being entirely contained within the band 21, each end of the transponder 13 is arranged at a distance D1 or D2 less than 8-12 mm from the medial plane M of the height H of the cross section of the pneumatic tire 1.

It is important to set forth that the transponder 13 must be entirely contained within the band 21 which, in the embodiment illustrated in FIGS. 5 and 6, is centered on the medial plane M of the height H of the cross section of the pneumatic tire 1, but the transponder 13 does not have to be centered on the medial plane M (that is, the transponder 13 can easily be moved toward the maximum or minimum of the band 21 provided that the constraint of being entirely contained within the band 21 is complied therewith). Consequently, in the embodiment illustrated in FIGS. 5 and 6, the transponder 13 is arranged in contact with the body ply 3 at (in proximity to) the medial plane M of the height H of the cross section of the pneumatic tire 1 and is not (necessarily) centered with respect to the medial plane M of the height H of the cross section of the pneumatic tire 1.

As mentioned hereinbefore, the transponder 13 is arranged radially more to the outside of the bead 4 and therefore radially more to the outside of the bead filler 6. Furthermore, the transponder 13 is arranged more to the inside of the sidewall 11 and is radially arranged more to the outside of the abrasion gum strip 12; consequently, the transponder 13 is arranged within a zone wherein the sidewall 11 is present and the abrasion gum strip 12 is not present.

In the embodiment illustrated in FIG. 5, the transponder 13 (contained within the sleeve 17) is arranged axially to the inside of the flap of the body ply 3, and therefore is laterally (in other words, axially, that is, parallel to the axis of rotation of the pneumatic tire 1) bordering the body ply 3 on both sides; in other words, the transponder 13 is in contact with both sides (in other words, on the right and on the left, that is, both internally and externally) with corresponding portions of the body ply 3.

In the embodiment illustrated in FIG. 6, the transponder 13 (contained within the sleeve 17) is arranged axially to the exterior of the flap of the body ply 3, and therefore is laterally (in other words, axially, that is, parallel to the axis of rotation of the pneumatic tire 1) bordering on one side (internally) with the body ply 3 and on the opposite side (externally) with the sidewall 11; in other words, the transponder 13 is in contact internally with a corresponding portion of the body ply 3 and is in contact externally with a corresponding portion of the sidewall 11.

Figure 7:
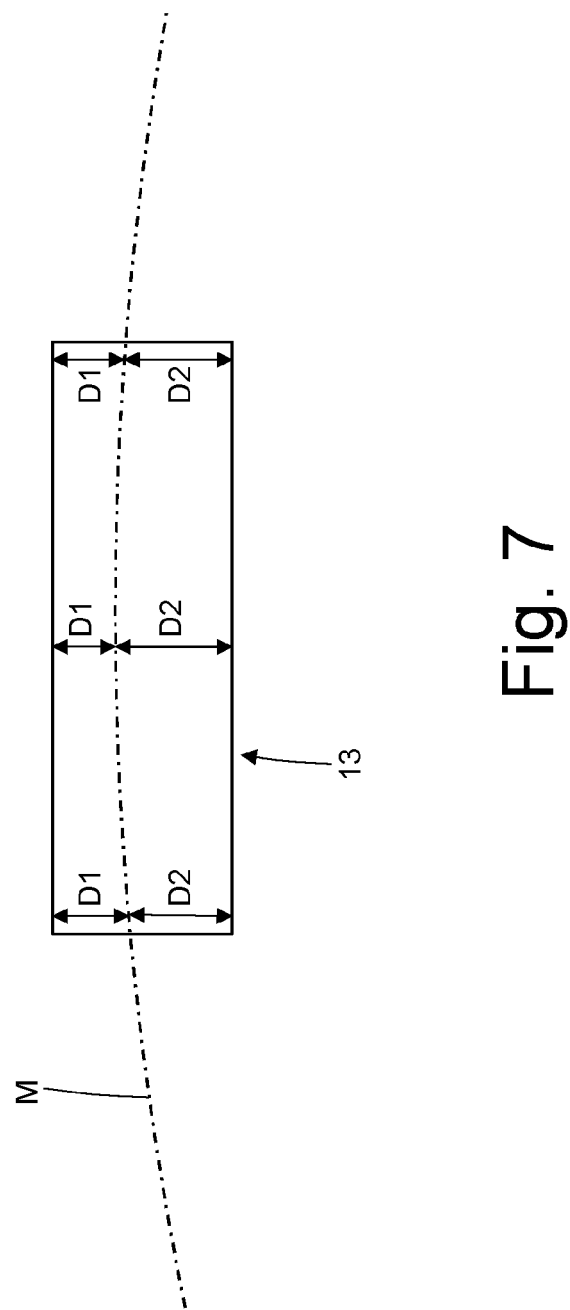
FIG. 7 is a schematic view that shows the arrangement of the transponder of FIG. 2 with respect to an edge of the body ply of the pneumatic tire of FIG. 1.

As mentioned hereinbefore, the transponder 13 is arranged circumferentially and has a parallelepiped rectangular form and in the interior of the pneumatic tire 1 does not follow the circular progression of all the other components of the pneumatic tire 1; as a result, as illustrated in FIG. 7, the radial distance D1 or D2 between each edge of the transponder 13 and the medial plane M of the height H of the cross section of the pneumatic tire 1 is continuously variable (even if 1-3 mm at the most) along the entire extent of the transponder 13, inasmuch as the transponder 13 has a rectangular progression, while the medial plane M of the height H of the cross section of the pneumatic tire 1 has a circular progression. In this respect, it is important to set forth that the maximum (that is, the greatest possible) radial distance D1 or D2 between each edge of the transponder 13 and the medial plane M of the height H of the cross section of the pneumatic tire 1 is always less than 8-12 mm.

Figure 8:
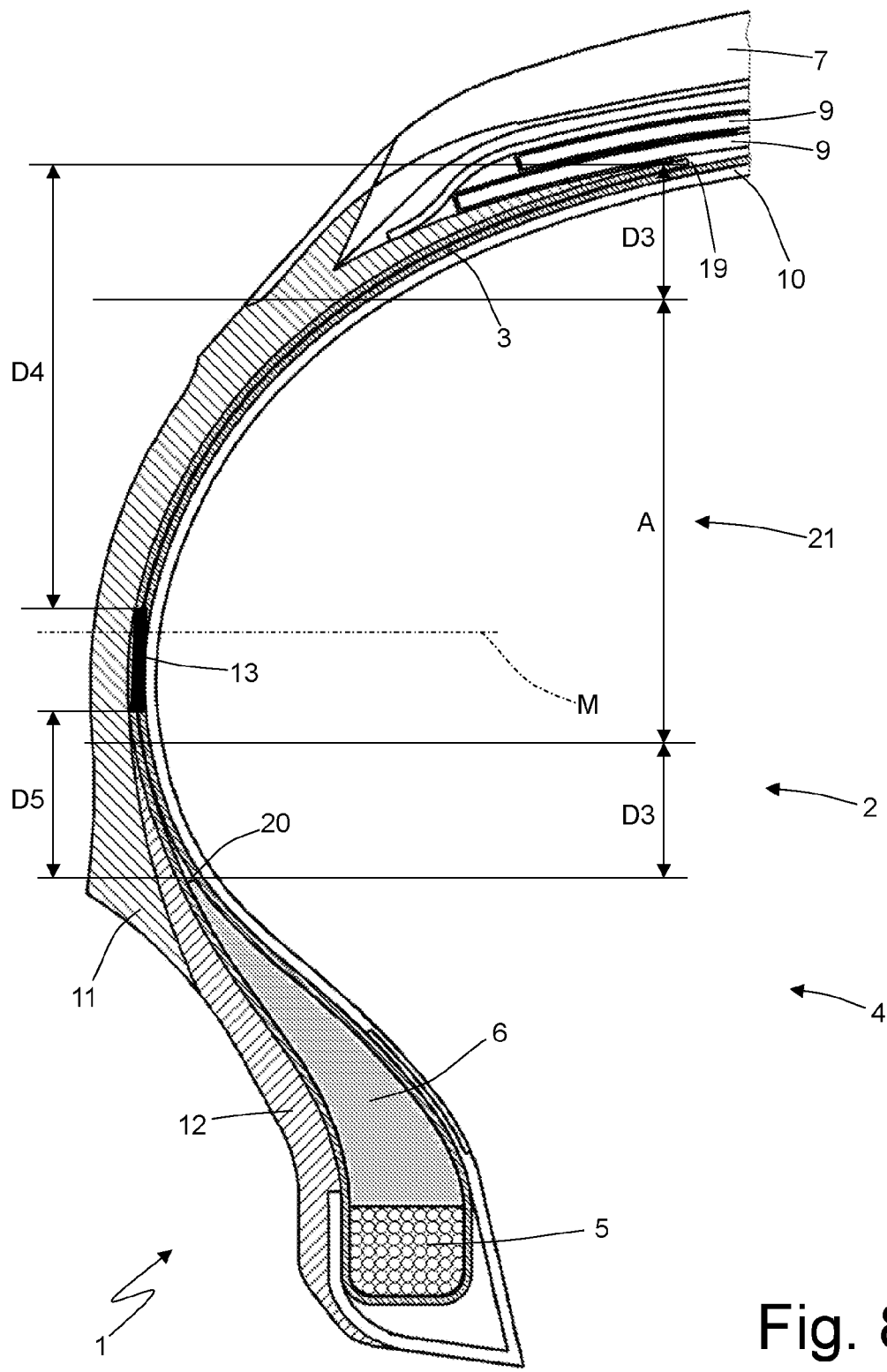
FIGS. 8 and 9 are two enlarged views of a detail of FIG. 1 according to two further embodiments.
Figure 9:
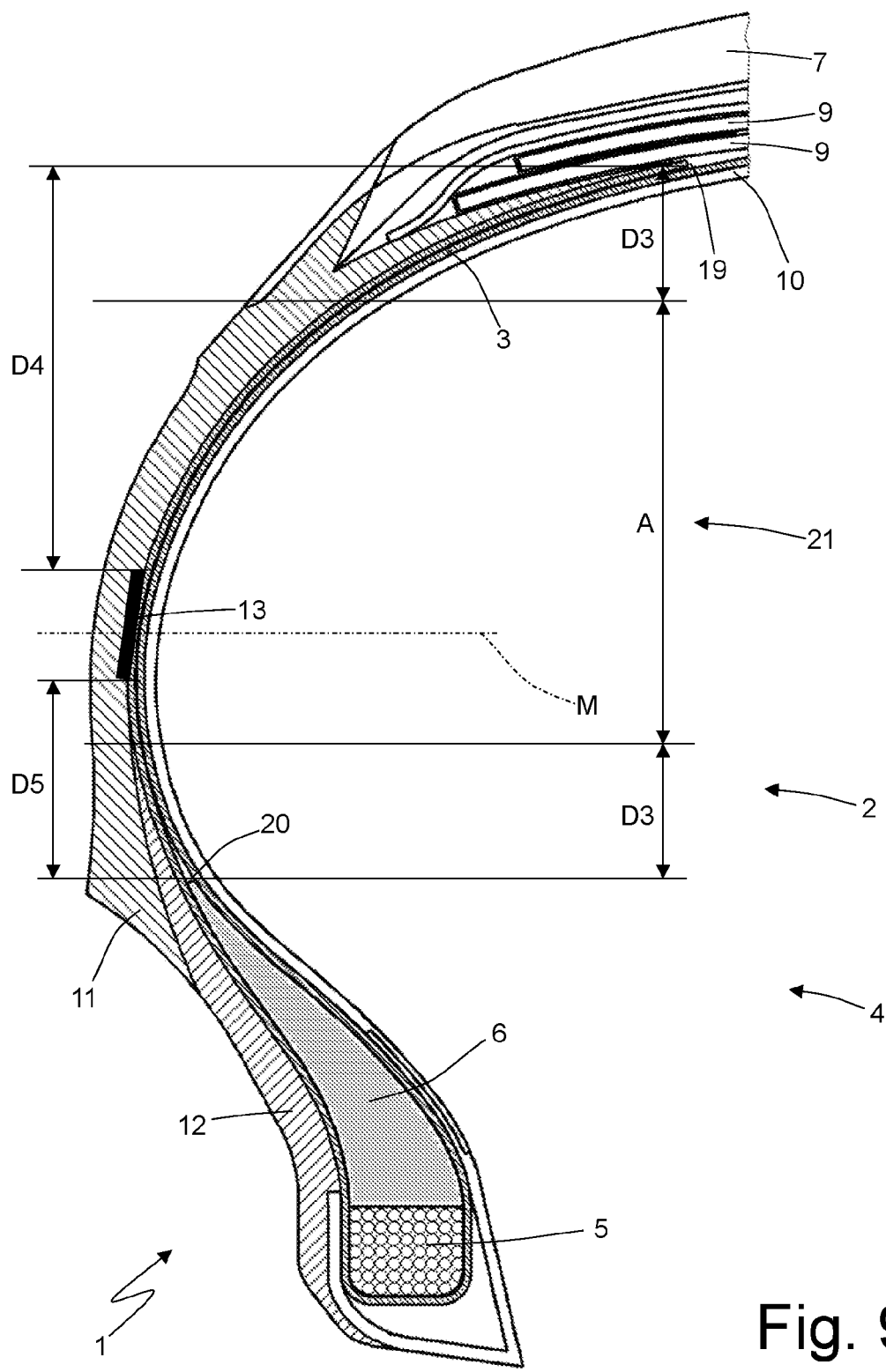

In the alternative embodiment illustrated in FIGS. 8 and 9, the band 21 is no longer defined with respect to the medial plane M of the height H of the cross section of the pneumatic tire 1, but it is defined with respect to the edge 19 of the body ply 3 and with respect to the edge 20 radially more to the outside of the bead filler 6. In particular, a radially external end of the band 21 is arranged at a radial distance D3 equal to 10 mm from the edge 19 of the body ply 3, while a radially internal end of the band 21 is arranged at a distance D3 equal to 10 mm from the edge 20 radially more to the outside of the bead filler 6. As a result, the transponder 13 (and in particular a radially external edge of the transponder 13) is located at a radial distance D4 greater than 10 mm from the edge 19 of the body ply 3 and, at the same time, the transponder 13 (and in particular a radially internal edge of the transponder 13) is located at a radial distance D5 greater than 10 mm from the edge 20 radially more to the outside of the bead filler 6.

The band 21 (at the interior of which the transponder 13 is completely contained) of the embodiment of FIGS. 8 and 9 is normally more expansive than the band 21 of the embodiment of FIGS. 5 and 6; furthermore, the band 21 (at the interior of which the transponder 13 is completely contained) of the embodiment of FIGS. 8 and 9 is not normally centered with respect to the medial plane M of the height H of the cross section of the pneumatic tire 1, unlike the band 21 of the embodiment of FIGS. 5 and 6.

In the embodiment illustrated in FIG. 8 (analogously to the embodiment illustrated in FIG. 5), the transponder 13 (contained within the sleeve 17) is arranged axially to the inside of the flap of the body ply 3, and therefore is laterally (in other words, axially, that is, parallel to the axis of rotation of the pneumatic tire 1) bordering the body ply 3 on both sides; in other words, the transponder 13 is in contact with both sides (in other words, on the right and on the left, that is, both internally and externally) with corresponding portions of the body ply 3.

In the embodiment illustrated in FIG. 9 (analogously to the embodiment illustrated in FIG. 6), the transponder 13 (contained within the sleeve 17) is arranged axially to the exterior of the flap of the body ply 3, and therefore is laterally (in other words, axially, that is, parallel to the axis of rotation of the pneumatic tire 1) bordering on one side (internally) with the body ply 3 and on the opposite side (externally) with the sidewall 11; in other words, the transponder 13 is in contact internally with a corresponding portion of the body ply 3 and is in contact externally with a corresponding portion of the sidewall 11.

It is important to set forth that the body ply 3 could be provided with local reinforcing elements, which are applied to limited portions of the body ply 3; for example, the body ply 3 could be provided with a fabric reinforcement, which is applied in proximity to the beads 4, and/or with a calendered "squeegee", which is also applied close to the beads 4. In this case, such reinforcing elements become an integral part of the body ply 3, and, therefore, the transponder 13 can be arranged in contact with the body ply 3 also at such reinforcing elements.

The pneumatic tire 1 can be the "standard" type or else the "non-standard" type; for example, the pneumatic tire 1 could be of the "run-flat" type, of the "sponge" type (that is, provided internally with a spongy body having an acoustic effect), or of the "sealant" type (that is, provided with a sealing agent which is capable of closing any holes).

The embodiments described herein can be combined with each other without departing from the scope of protection of the present disclosure.

The pneumatic tire 1 described above has many advantages.

First and foremost, in the aforementioned pneumatic tire 1 the position of the transponder 13 makes it possible to minimize the stresses and deformations to which the transponder 13 is subjected (both during the construction of the pneumatic tire 1 and during the use of the pneumatic tire 1) and, at the same time, makes it possible to minimize transponder 13 radio frequency communications disturbances and interference (in this way, the transponder 13 can be read at a distance of over 3 meters if the pneumatic tire 1 is not mounted on a metallic rim and at a distance of over 2 meters if the pneumatic tire 1 is mounted on a metallic rim).

Furthermore, in the pneumatic tire 1 described above the presence of the transponder 13 (which is nevertheless a "foreign object" immersed within the pneumatic tire 1) does not have a negative impact upon the performance and the durability (or upon the operating life) of the pneumatic tire 1 itself.

In the embodiment illustrated in FIGS. 5 and 8, the transponder 13 is better protected from the exterior insofar as it is located more to the inside of a layer of the body ply 3. In the embodiment illustrated in FIGS. 6 and 9, local deformations of the body ply 3 are avoided, and the risk of entrapping air inside the body ply 3 at the transponder 13 is completely avoided, because the space for housing the transponder 13 is completely formed in locally deforming only the sidewall 11 (which is made of a thick layer of rubber and therefore has great deformation capacity).

Finally, the construction of the pneumatic tire 1 described above is simple, inasmuch as the transponder 1 can easily be made to adhere to the body ply 3 when the body ply 3 is still completely flat (that is, before wrapping the body ply 3 around the forming drum) or the transponder 1 can easily be made to adhere to a sidewall 11 before mounting the sidewall 11 itself; obviously, the transponder 1 can be made to adhere to a sidewall 11 only in the embodiments illustrated in FIGS. 6 and 9, while the transponder 1 can be made to adhere to the body ply 3 in all of the embodiments.

LIST OF REFERENCE NUMBERS IN THE FIGURES

1 pneumatic tire
2 carcass
3 body ply
4 beads
5 bead core
6 bead filler
7 tread
8 tread belt
9 tread plies
10 innerliner
11 sidewalls
12 abrasion gum strips
13 transponder
14 electronic circuit
15 antenna
16 support
17 sleeve
18 strips
19 edge
20 edge
21 band
H height
L length
W width
T thickness
A amplitude
D1 distance
D2 distance
D3 distance
D4 distance
D5 distance

The invention claimed is:

1. A pneumatic tire comprising:

a toroidal carcass, which is made up of a unique and single body ply partially collapsed onto itself and therefore having two lateral flaps, in each of which an edge of the body ply rests against an intermediate portion of the body ply itself;

two annular beads, each of which is surrounded by the body ply and has a bead core and a bead filler;

an annular tread;

a tread belt comprising at least one tread ply;

a pair of sidewalls arranged axially externally to the body ply between the tread and the beads;

a pair of abrasion gum strips arranged axially externally to the body ply, radially more to the inside of the sidewalls, and at the beads; and a transponder which is arranged in contact with the body ply at one of the flaps of the body ply and is located radially more to the inside of an edge of the body ply;

wherein each flap of the body ply terminates radially below the tread ply in such a way that in each flap of the body ply the edge of the body ply is in contact with the tread ply;

the transponder is radially arranged between the edge of the body ply and an edge radially external to the bead filler;

a first radial distance greater than 10 mm is provided between a radially external end of the transponder and the edge of the body ply; and a second radial distance greater than 10 mm is provided between a radially internal end of the transponder and the radially external edge of the bead filler.

2. The pneumatic tire according to claim 1, wherein each end of the transponder is arranged at a third radial distance of less than 10 mm from a medial plane of a height of a cross section of the pneumatic tire.

3. The pneumatic tire according to claim 1, wherein the transponder is internally contained within a band which is centered on the medial plane of the height of the cross section of the pneumatic tire and has an overall radial amplitude between 16-24 mm.

4. The pneumatic tire according to claim 1, wherein the transponder is axially arranged in the interior of the flap of the body ply.

5. The pneumatic tire according to claim 4, wherein the transponder is axially in contact on both sides with corresponding portions of the body ply.

6. The pneumatic tire according to claim 1, wherein the transponder is axially arranged on the exterior of the flap of the body ply, is axially internally in contact with a corresponding portion of the body ply, and is axially externally in contact with a corresponding portion of the sidewall.

7. The pneumatic tire according to claim 1, wherein the transponder is arranged within a zone wherein the sidewall is present and the abrasion gum strip is not present.

8. The pneumatic tire according to claim 1, wherein the transponder is inserted within a sleeve made of two strips of rubber superimposed and pressed one onto the other.

9. The pneumatic tire according to claim 8, wherein the two strips of rubber of the sleeve are 1-2 mm longer/wider than the transponder.

10. The pneumatic tire according to claim 8, wherein the two strips of rubber are deformed around the transponder.

11. The pneumatic tire according to claim 1, wherein the transponder is circumferentially arranged, has a rectilinear form and therefore in the interior of the pneumatic tire does not follow a circular progression associated with the pneumatic tire.

12. A pneumatic tire comprising:
a toroidal carcass, which is made up of a unique and single body ply partially collapsed onto itself and therefore having two lateral flaps, in each of which an edge of the body ply rests against an intermediate portion of the body ply itself;
two annular beads, each of which is surrounded by the body ply and has a bead core and a bead filler;
an annular tread;
a tread belt comprising at least one tread ply;
a pair of sidewalls arranged axially externally to the body ply between the tread and the beads;
a pair of abrasion gum strips arranged axially externally to the body ply, radially more to the inside of the sidewalls, and at the beads; and
a transponder which is arranged in contact with the body ply at a flap of the body ply and is located radially more to the inside of an edge of the body ply;
wherein the transponder is axially arranged on the exterior of the flap of the body ply, is axially internally in contact with a corresponding portion of the body ply, and is axially externally in contact with a corresponding portion of the sidewall;
each flap of the body ply terminates radially below the tread ply in such a way that in each flap of the body ply the edge of the body ply is in contact with the tread ply;
the transponder is radially arranged between the edge of the body ply and an edge radially external to the bead filler;
a first radial distance greater than 10 mm is provided between a radially external end of the transponder and the edge of the body ply; and
a second radial distance greater than 10 mm is provided between a radially internal end of the transponder and the radially external edge of the bead filler.

13. The pneumatic tire according to claim 12, wherein each end of the transponder is arranged at a third radial distance of less than 10 mm from a medial plane of a height of a cross section of the pneumatic tire.

14. The pneumatic tire according to claim 12, wherein the transponder is internally contained within a band which is centered on the medial plane of the height of the cross section of the pneumatic tire and has an overall radial amplitude between 16-24 mm.

15. The pneumatic tire according to claim 12, wherein the transponder is arranged within a zone wherein the sidewall is present and the abrasion gum strip is not present.

16. The pneumatic tire according to claim 12, wherein the transponder is inserted within a sleeve made of two strips of rubber superimposed and pressed one onto the other.

17. The pneumatic tire according to claim 16, wherein the two strips of rubber of the sleeve are 1-2 mm longer/wider than the transponder.

18. The pneumatic tire according to claim 16, wherein the two strips of rubber are deformed around the transponder.

19. The pneumatic tire according to claim 12, wherein the transponder is circumferentially arranged, has a rectilinear form and therefore in the interior of the pneumatic tire does not follow a circular progression associated with the pneumatic tire.

* * * * *